(12) United States Patent
Xiao

(10) Patent No.: US 11,518,185 B1
(45) Date of Patent: Dec. 6, 2022

(54) MULTI-FUNCTION PEN

(71) Applicant: Shenzhen Zhixinda Technology Co., Ltd., Shenzhen (CN)

(72) Inventor: Yihao Xiao, Pingxiang (CN)

(73) Assignee: Shenzhen Zhixinda Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/482,489

(22) Filed: Sep. 23, 2021

(51) Int. Cl.
| | |
|---|---|
| *B43K 5/00* | (2006.01) |
| *B43K 5/14* | (2006.01) |
| *B43K 29/08* | (2006.01) |
| *B43K 29/18* | (2006.01) |
| *B43K 29/10* | (2006.01) |
| *B43K 29/02* | (2006.01) |
| *B25B 15/00* | (2006.01) |
| *F21V 23/04* | (2006.01) |
| *F21Y 115/10* | (2016.01) |

(52) U.S. Cl.
CPC ............... *B43K 5/005* (2013.01); *B43K 5/14* (2013.01); *B43K 29/02* (2013.01); *B43K 29/08* (2013.01); *B43K 29/10* (2013.01); *B43K 29/18* (2013.01); *F21V 23/04* (2013.01); *B25B 15/00* (2013.01); *F21Y 2115/10* (2016.08)

(58) Field of Classification Search
CPC .......... B43K 5/005; B43K 5/14; B43K 29/08; B43K 29/18; B43K 29/10; B43K 29/02; F21V 23/04; B25B 15/00; F21Y 2115/10

USPC ........................................................ 401/195
See application file for complete search history.

(56) References Cited

U.S. PATENT DOCUMENTS

| | | | | |
|---|---|---|---|---|
| 6,142,769 | A | * | 11/2000 | Walker .................... F23Q 2/32 362/120 |
| 6,261,016 | B1 | | 7/2001 | Liu |
| 7,185,533 | B2 | | 3/2007 | Lee |
| 9,454,246 | B2 | | 9/2016 | Seo et al. |
| D960,977 | S | * | 8/2022 | Rajasekaran ................ D19/123 |
| 2011/0072594 | A1 | * | 3/2011 | Danias-Borkin ......... B67B 7/44 7/155 |

* cited by examiner

*Primary Examiner* — David J Walczak
(74) *Attorney, Agent, or Firm* — Georgi Korobanov

(57) ABSTRACT

A multi-function pen includes a cap; a metal body connected with the cap, where a first accommodating cavity is formed between the metal body and the cap, an outer wall of the metal body is provided with a gap for opening a bottle cap, and the gap is disposed below the first accommodating cavity; a light emitting structure accommodated in the first accommodating cavity; a nib in threaded connection with the metal body, where a second accommodating cavity is formed between the nib and the metal body; and a refill accommodated in the second accommodating cavity. The multi-function pen can meet the basic working demands of electricians and woodworkers, and is small, light, convenient to be put in pockets of operators and practical.

10 Claims, 5 Drawing Sheets

MULTI-FUNCTION PEN

CROSS-REFERENCE TO RELATED APPLICATIONS

This application claims priority to Chinese Patent Application No. 202121938072.2 with a filing date of Aug. 18, 2021. The content of the aforementioned application, including any intervening amendments thereto, is incorporated herein by reference.

TECHNICAL FIELD

The disclosure relates to the technical field of mechanical engineering, and in particular to a multi-function pen.

BACKGROUND

In the technical field of mechanical engineering, to meet various demands in practical work, operators usually need to bring a tool kit for various operations. However, the tool kit is generally large, heavy and inconvenient to carry, which is not conducive to work efficiency and safety.

Based on this, we propose a multi-function pen, which meets the basic working demands of electricians and woodworkers, and is small and light enough to be put in pockets of the operators.

SUMMARY

Aiming at the defect that a current tool kit is large, heavy and inconvenient to carry, the technical problem to be solved by the embodiment of the disclosure is to provide a multi-function pen convenient to carry.

To solve the above technical problem, the embodiment of the disclosure provides the multi-function pen, including a cap;

a metal body connected with the cap, where a first accommodating cavity is formed between the metal body and the cap; an outer wall of the metal body is provided with a gap for opening a bottle cap; and the gap is disposed below the first accommodating cavity;

a light emitting structure accommodated in the first accommodating cavity;

a nib in threaded connection with the metal body, where a second accommodating cavity is formed between the nib and the metal body; and a refill accommodated in the second accommodating cavity.

Optionally, the outer wall of the metal body may be provided with at least one plane extending axially; and the plane may be provided with a graduated scale.

Optionally, the cross section of the metal body may be polygonal; the metal body may be provided with two planes extending axially; and each of the planes may be provided with a graduated scale.

Optionally, the metal body may be internally provided with a level structure; the outer wall of the metal body may be provided with a window for observing a state of liquid in the level structure; the window may be intercommunicated with the first accommodating cavity; and the level structure may be accommodated in the first accommodating cavity.

Optionally, the gap may be provided with a first contact portion and a second contact portion matched with the first contact portion, which may be used for contacting two sides of the bottle cap, respectively; and the second contact portion may be close to the refill and provided with a bulge.

Optionally, the light emitting structure may include a switch, a button cell, an electrode and a light emitting diode (LED) lamp; the switch and the button cell may be accommodated in the electrode; the electrode may be used for the connection between the button cell with the LED lamp; and the switch may be used for controlling disconnection of a path between the button cell and the electrode.

Optionally, the refill may be fixedly connected with the nib and provided with a shell; the shell may be rotatably connected with the nib; the refill may be retractably accommodated between the nib and the shell; and an outer wall of the shell may be connected with a rubber structure used as a screen handwriting pen.

Optionally, a third accommodating cavity may be formed between the shell and the rubber structure; and a screwdriver may be accommodated in the third accommodating cavity.

Optionally, the first accommodating cavity may be not communicated with the gap; and the second accommodating cavity may be intercommunicated with the gap.

Optionally, a spring for buffering pressing on the light emitting structure by a user may be further arranged between the level structure and the light emitting structure.

The embodiment of the disclosure has the following beneficial effects: The multi-function pen has a volume of a common pen, but has functions of illumination, decapping and writing. It also has more accessory functions such as a level, a screen writing pen, a screwdriver and a graduated scale. In addition, it is small, light and convenient to be put in pockets of operators.

BRIEF DESCRIPTION OF THE DRAWINGS

To describe the technical solutions in the embodiments of the disclosure or in the prior art more clearly, the following briefly introduces the accompanying drawings required for describing the embodiments. Apparently, the accompanying drawings in the following description show merely some embodiments of the disclosure, and a person of ordinary skill in the art may still derive other drawings from these accompanying drawings without creative efforts.

Figure 1:
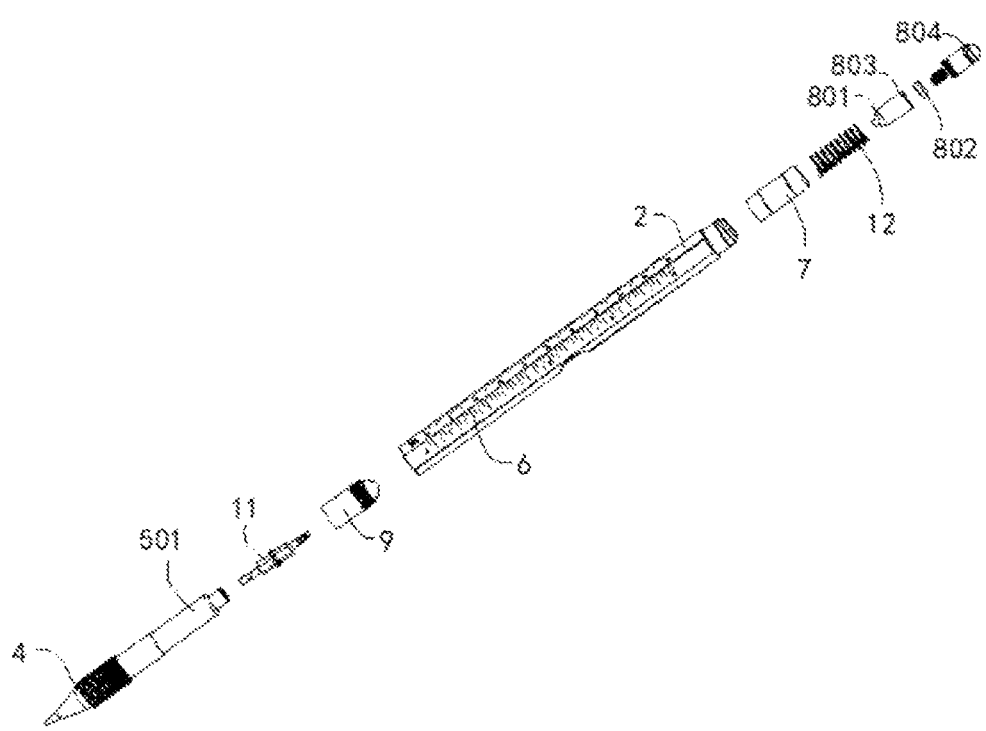
FIG. 1 is a structural exploration schematic diagram I of the disclosure.

In the drawings, 1 represents a cap; 2 represents a metal body; 201 represents a first accommodating cavity; 3 represents a gap; 301 represents a first contact portion; 302 represents a second contact portion; 4 represents a nib; 401 represents a second accommodating cavity; 5 represents a refill; 501 represents a shell; 6 represents a graduated scale; 7 represents a level structure; 701 represents a window; 8 represents a light emitting structure, 801 represents a switch; 802 represents a button cell; 803 represents an electrode; 804 represents a light emitting diode (LED) lamp; 9 represents a rubber structure; 10 represents a third accommodating cavity, 11 represents a screwdriver; and 12 represents a spring.

DETAILED DESCRIPTION OF THE EMBODIMENTS

A clear and complete description of the technical solutions in the embodiments of the disclosure will be given below, in combination with the accompanying drawings in the embodiments of the disclosure. Apparently, the embodiments described below are a part, but not all, of the embodiments of the disclosure. All other embodiments obtained by a person of ordinary skill in the art based on the embodiments of the disclosure without inventive efforts fall within the protection scope of the disclosure.

Refer to FIGS. 1-5, a multi-function pen includes a cap 1; a metal body 2 connected with the cap 1, where a first accommodating cavity 201 is formed between the metal body 2 and the cap 1; an outer wall of the metal body 2 is provided with a gap 3 for opening a bottle cap; and the gap 3 is disposed below the first accommodating cavity 201;

a light emitting structure 8 accommodated in the first accommodating cavity 201;

a nib 4 in threaded connection with the metal body 2, where a second accommodating cavity 401 is formed between the nib 4 and the metal body 2; and a refill 5 accommodated in the second accommodating cavity 401.

The light emitting structure 8 is arranged in the multi-function pen to provide illumination during work of electricians, is not always restricted to a light emitting diode (LED) and could be other light emitting electric appliances; and the gap 3 is arranged on the metal body 2 to open a bottle cap, so as to improve the functionality and practicability of the pen.

Figure 2:
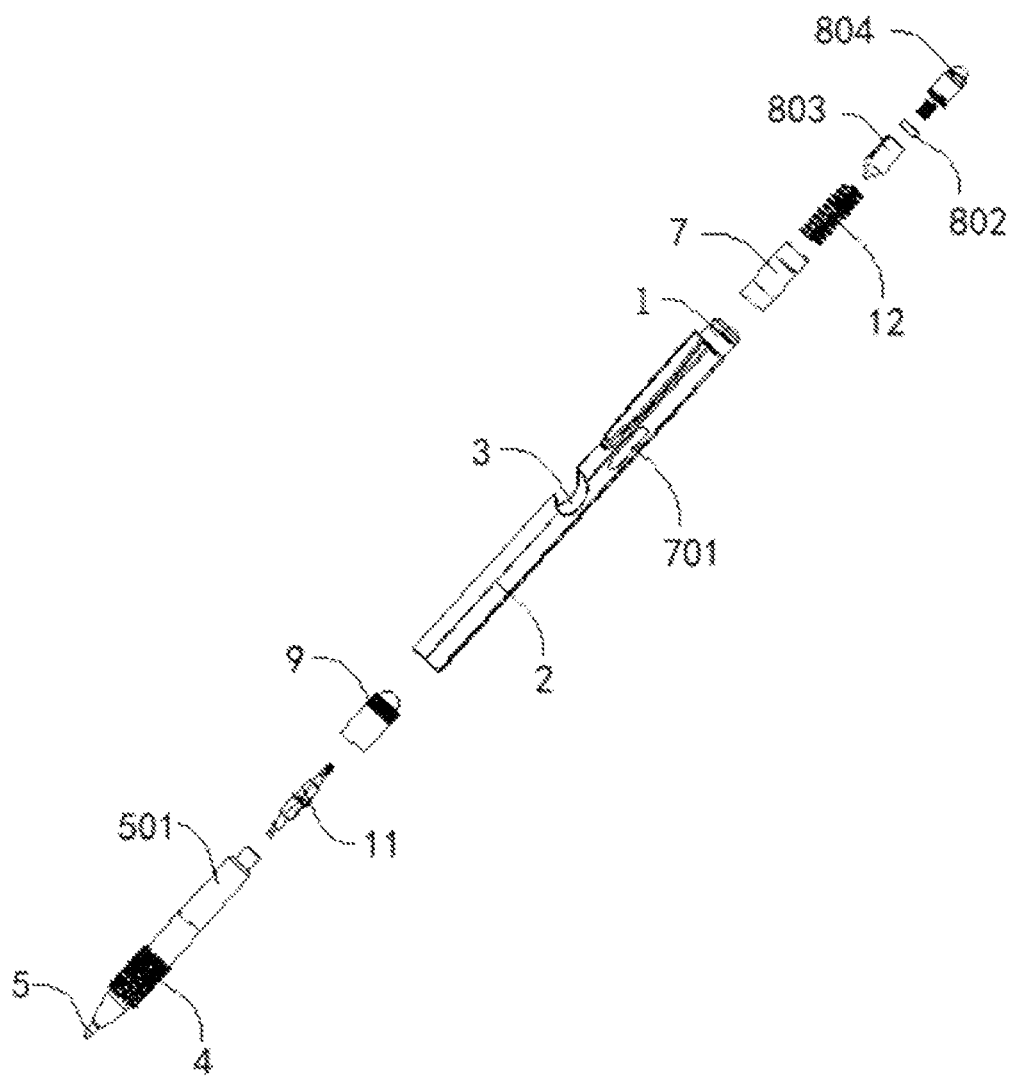
FIG. 2 is a structural exploration schematic diagram II of the disclosure.
Figure 3:
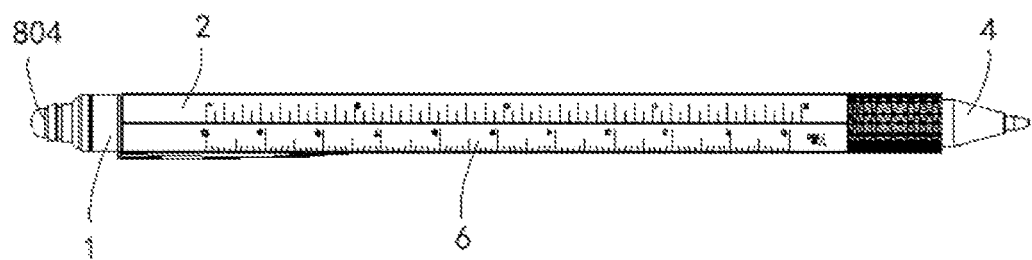
FIG. 3 is a structural schematic diagram of the disclosure.
Figure 4:
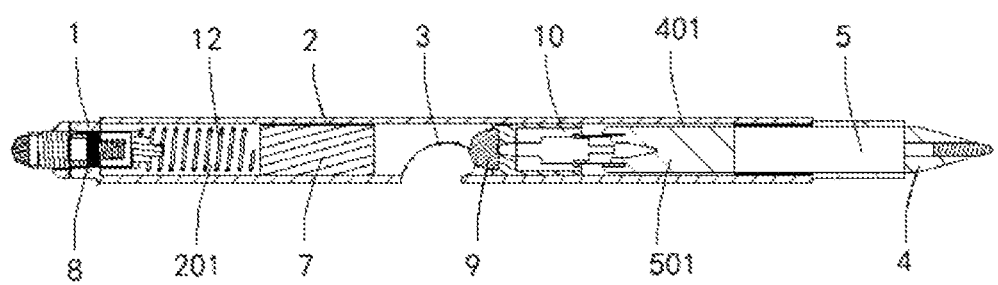
FIG. 4 is a structural schematic diagram of a section of the cross section of the disclosure.

Refer to FIGS. 1-3, the outer wall of the metal body 2 may be provided with at least one plane extending axially; and the plane may be provided with a graduated scale 6.

Further, the cross section of the metal body 2 may be polygonal; the metal body 2 may be provided with two planes extending axially; and each of the planes may be provided with a graduated scale 6.

The graduated scale 6 may be arranged outside the metal body 2 to assist the electricians and woodworkers to work effectively, thereby providing functions of a standard and metric ruler.

Refer to FIG. 2, the metal body 2 may be internally provided with a level structure 7; the outer wall of the metal body 2 may be provided with a window 701 for observing a state of liquid in the level structure 7; the window 701 may be intercommunicated with the first accommodating cavity 201; and the level structure 7 may be accommodated in the first accommodating cavity 201. Therefore, the multi-function pen can have functions of a level, thereby improving the practicability.

Figure 5:
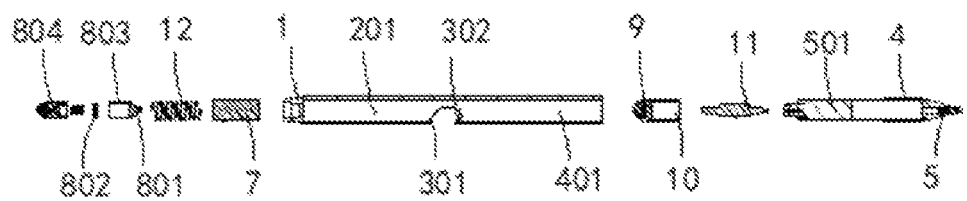
FIG. 5 is an exploration schematic diagram of the section of the cross section of the disclosure.

Refer to FIG. 5, the gap 3 may be provided with a first contact portion 301 and a second contact portion 302 matched with the first contact portion 301, which may be used for contacting two sides of the bottle cap, respectively; and the second contact portion 302 may be close to the refill 5 and provided with a bulge. Therefore, a function of opening the bottle cap is provided.

Refer to FIGS. 1-2, the light emitting structure 8 may include a switch 801, a button cell 802, an electrode 803 and an LED lamp 804; the switch 801 and the button cell 802 may be accommodated in the electrode 803; the electrode 803 may be used for connection between the button cell 802 and the LED lamp 804; and the switch 801 may be used for controlling disconnection of a path between the button cell 802 and the electrode 803. For LED illumination, electronic cells may be used for supplying power and may be repeatedly changed after power is consumed.

Further, the refill 5 may be fixedly connected with the nib 4 and provided with a shell 501; the shell 501 may be rotatably connected with the nib 4; the refill 5 may be retractably accommodated between the nib 4 and the shell 501; and an outer wall of the shell 501 may be connected with a rubber structure 9 used as a screen handwriting pen. Therefore, the multi-function pen may have a screen writing function and use ink and pencils for writing.

Further, a third accommodating cavity 10 may be formed between the shell 501 and the rubber structure 9; and a screwdriver 11 may be accommodated in the third accommodating cavity 10. Therefore, the electricians and woodworkers can dismount screws rapidly; and the screwdriver 11 may be a straight screwdriver or a cross screwdriver.

Further, the first accommodating cavity 201 may be not communicated with the gap 3; and the second accommodating cavity 401 may be intercommunicated with the gap 3.

Further, a spring 12 for buffering pressing on the light emitting structure 8 by a user may be further arranged between the level structure 7 and the light emitting structure 8, and may be used for retarding the pressing force, on the switch 801, of the user so as to prolong the service life of the switch 801.

The multi-function pen has a volume of a common pen, but has functions of illumination, decapping and writing. It also has more accessory functions such as a level, a screen writing pen, a dismounting screwdriver and a graduated scale. In addition, it is small, light, convenient to be put in pockets of operators, practicable and convenient for wide popularization.

The above disclosed is only preferred embodiments of the disclosure, and definitely should not be used to limit the scope of the claims of the disclosure. A person of ordinary skill in the art can understand all or some of the procedures for implementing the foregoing embodiments and make equivalent changes according to the claims of the disclosure. The equivalent changes still fall within the scope of the disclosure.

What is claimed is:

1. A multi-function pen, comprising:
   a cap (1);
   a metal body (2) connected with the cap (1), wherein a first accommodating cavity (201) is formed between the metal body (2) and the cap (1); an outer wall of the metal body (2) is provided with a gap (3) for opening a bottle cap; and the gap (3) is disposed below the first accommodating cavity (201);
   a light emitting structure (8) accommodated in the first accommodating cavity (201);
   a nib (4) in threaded connection with the metal body (2), wherein a second accommodating cavity (401) is formed between the nib (4) and the metal body (2); and
   a refill (5) accommodated in the second accommodating cavity (401).

2. The multi-function pen according to claim 1, wherein an outer wall of the metal body (2) is provided with at least one plane extending axially; and the plane is provided with a graduated scale (6).

3. The multi-function pen according to claim 2, wherein a cross section of the metal body (2) is polygonal; the metal body (2) is provided with two planes extending axially; and each of the planes is provided with the graduated scale (6).

4. The multi-function pen according to claim 2, wherein the metal body (2) is internally provided with a level structure (7); the outer wall of the metal body (2) is provided with a window (701) for observing a state of liquid in the level structure (7); the window (701) is intercommunicated with the first accommodating cavity (201); and the level structure (7) is accommodated in the first accommodating cavity (201).

5. The multi-function pen according to claim 4, wherein a spring (12) for buffering pressing on the light emitting structure (8) by a user is further arranged between the level structure (7) and the light emitting structure (8).

6. The multi-function pen according to claim 1, wherein the gap (3) is provided with a first contact portion (301) and a second contact portion (302) matched with the first contact portion (301), which are used for contacting two sides of the bottle cap, respectively; and the second contact portion (302) is close to the refill (5) and provided with a bulge.

7. The multi-function pen according to claim 1, wherein the light emitting structure (8) comprises a switch (801), a button cell (802), an electrode (803) and a light emitting diode (LED) lamp (804); the switch (801) and the button cell (802) are accommodated in the electrode (803); the electrode (803) is used for the connection between the button cell (802) and the LED lamp (804); and the switch (801) is used for controlling disconnection of a path between the button cell (802) and the electrode (803).

8. The multi-function pen according to claim 1, wherein the refill (5) is fixedly connected with the nib (4), the refill (5) provided with a shell (501) rotatably connected with the nib (4); the refill (5) is retractably accommodated between the nib (4) and the shell (501); and an outer wall of the shell (501) is connected with a rubber structure (9) used as a screen handwriting pen.

9. The multi-function pen according to claim 8, wherein a third accommodating cavity (10) is formed between the shell (501) and the rubber structure (9); and a screwdriver (11) is accommodated in the third accommodating cavity (10).

10. The multi-function pen according to claim 1, wherein the first accommodating cavity (201) is not communicated with the gap (3); and the second accommodating cavity (401) is intercommunicated with the gap (3).

* * * * *